Patented Sept. 11, 1945

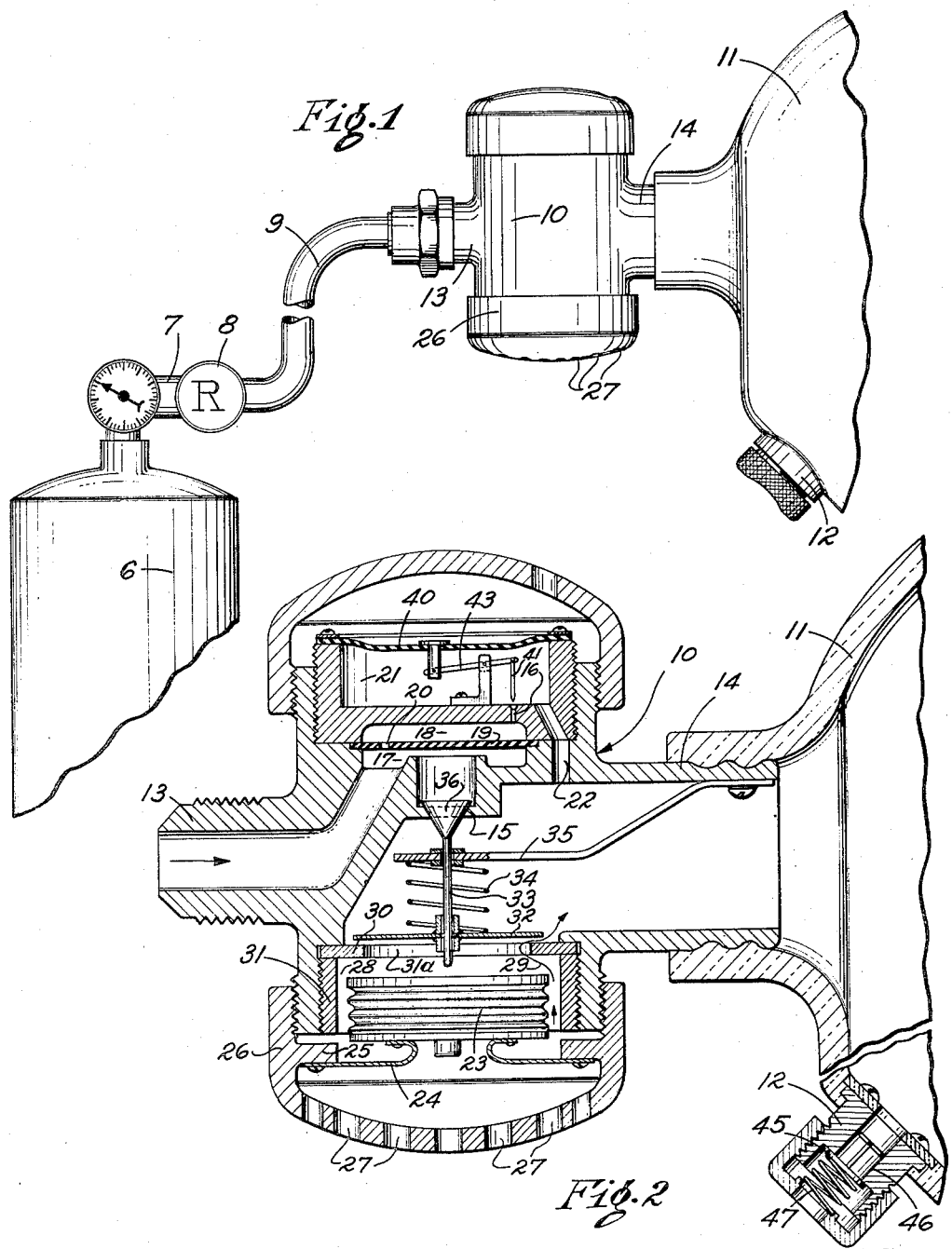

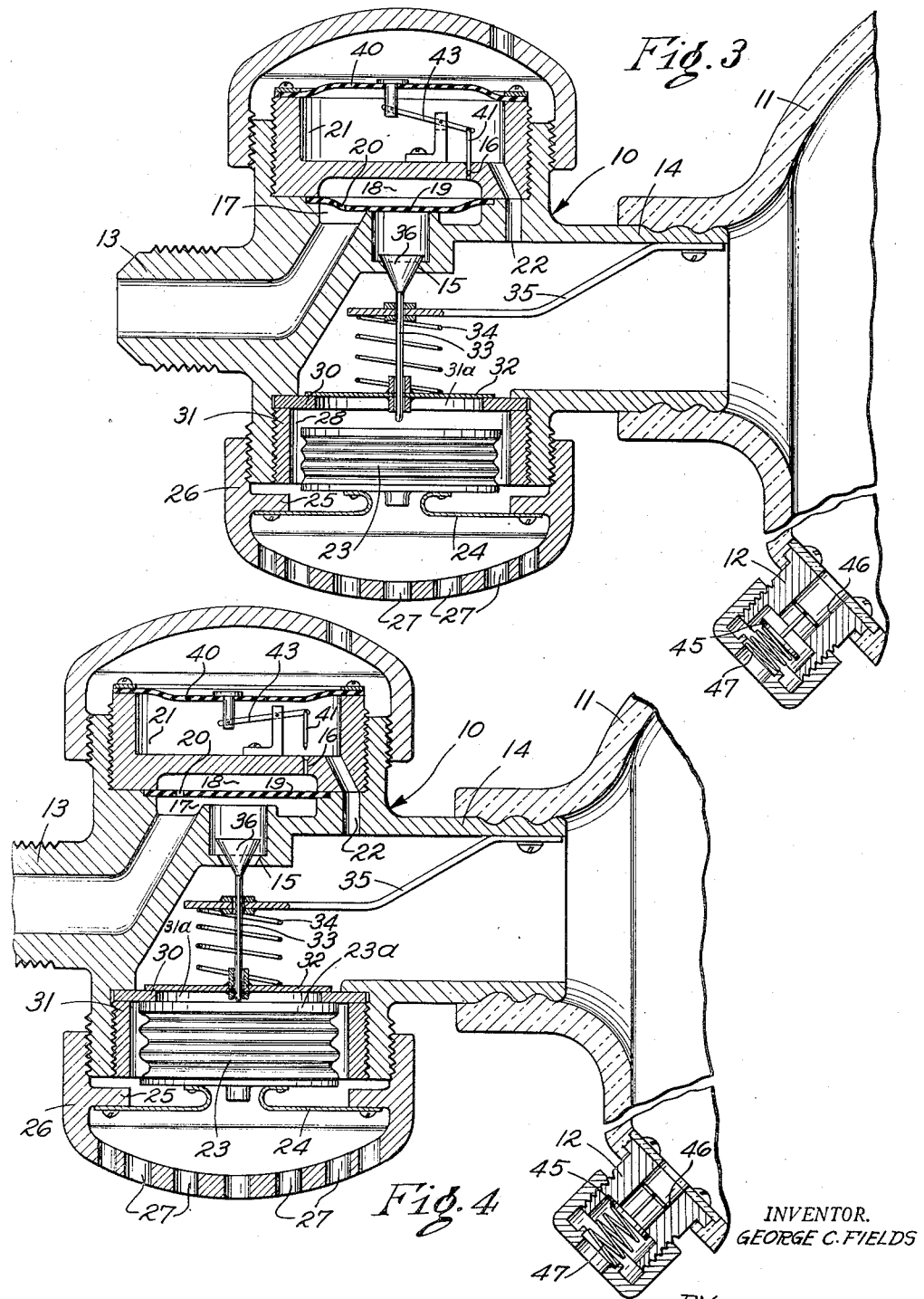

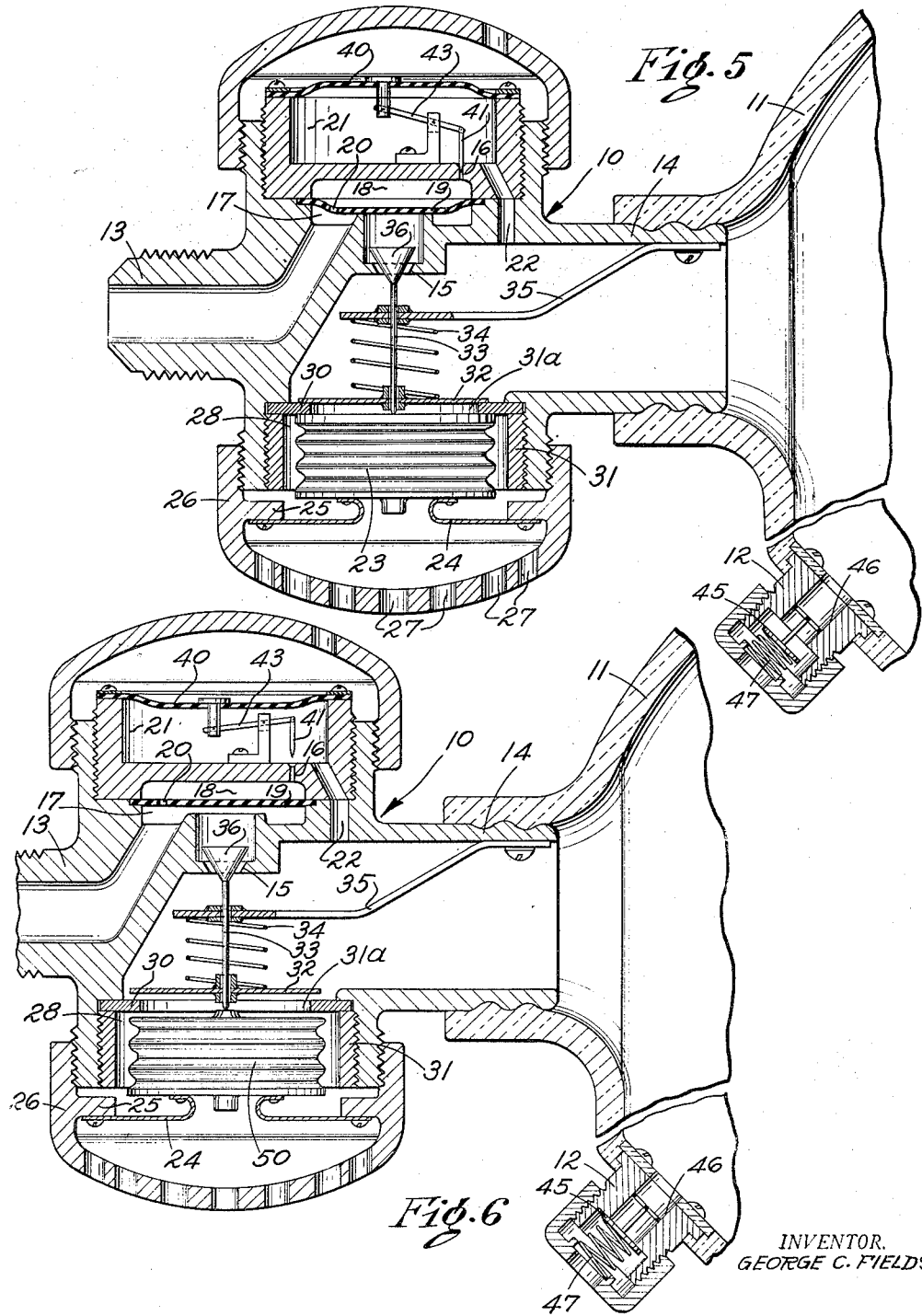

2,384,669

UNITED STATES PATENT OFFICE 2,384,669

OXYGEN SYSTEM

George C. Fields, Euclid, Ohio

Application July 29, 1943, Serial No. 496,535

5 Claims. (Cl. 137—153)

This invention relates to oxygen equipment and more particularly to oxygen equipment designed for use in high altitude flight. Among the important developments of the current war are the improvements in aircraft which permit sustained operation at high altitudes such as for instance 50,000 feet. The improvements in engine design and performance and the improvements in the design of the aircraft to permit such high altitude flight do not appear to have been accompanied by corresponding improvements in the oxygen equipment designed to feed oxygen to the aviators at such high altitudes. The oxygen equipment currently used presents a number of disadvantages particularly with respect to the efficient use of the oxygen, the difficulty in maintaining the equipment in operation at low temperatures and the danger of failure of the equipment to operate due to the complexity of its construction. Among the prior art devices provided for feeding oxygen to the aviator, and one enjoying wide current use is that device known as a demand regulator. This type of device includes a diaphragm operated valve, which diaphragm is in communication with the avaitor's mask and is so arranged that the aviator must produce within the mask by inhalation a pressure drop across the diaphragm so as to open a valve feeding oxygen into the mask. By the use of a relatively large diaphragm and the use of levers between the diaphragm and the valve it controls, slight conscious effort on the part of the aviator ordinarily produces the required pressure drop in the diaphragm providing a seal is maintained between the aviator's face and the mask and further providing the mask is not too far from the diaphragm. It will be understood, however, by those skilled in the art, that leakage around the mask will require an increased effort on the part of the aviator in order to effect the required pressure differential on the diaphragm so as to operate the same. It would not be feasible or desirable to have each mask custom built or fitted to the contour of each aviator's face and consequently, the best possible fit in practice is a compromise which results in some leakage between the mask and the face of the wearer.

It will also be understood that the weight and bulk of the prior art devices require that they be mounted on the wall of the aircraft and thus are some distance from the mask. This means that the aviator's inhalation must overcome the inertia of the column of air in the tube between the mask and the diaphragm in order to actuate the diaphragm.

Accordingly, with such prior art devices as above described, the aviators experience discomfort and fatigue due to the conscious determined efforts required to overcome the leaks around the edge of the mask and inertia of the air column in the tube to effect the production of a pressure drop on the diaphragm sufficient to supply the aviator with oxygen. The adverse psychological effect accompanying such labored breathing presents a serious mental hazard to the aviator which, in some cases, nullifies the tactical advantage of his high altitude.

A further definite characteristic of such prior art oxygen regulators is one relating to the lack of economy of oxygen in their use. Such prior art devices are constructed so that a mixture of oxygen and air is effected within the regulator and this mixture is fed into the mask. As the regulator is moved to high altitudes the proportion of oxygen to that of outside air is increased to the point where at extremely high altitudes the aviator is fed pure oxygen. Those familiar with the chemistry of the oxygen transfer in the lungs are aware of the fact that only a small part of the oxygen contained in each breath of air taken into the lungs is brought into intimate contact with that portion of the lungs which is capable of transferring the oxygen to the blood. It is the first portion of each breath of air which is led into the minute interstices of the lung which does the important work of transferring the oxygen from that portion of the breath to the blood. Accordingly, the larger part of the breath mainly that part which follows the first few cubic centimeters is not utilized by the body, but merely serves as a packing or filling medium which forces the first portion of the breath down into the minute interstices of the lungs.

From the foregoing brief description of the manner in which oxygen is transferred to the blood, it will be understood that the only important part of the breath taken into the lungs is the first part and that the major portion of the breath is unimportant with respect to its oxygen content. According to the prior art devices the entire oxygen and air mixture fed into the aviator's mask is substantially uniform with respect to its oxygen content. In other words, the first portion of each breath is enriched with oxygen to meet the demands of the aviator's body and the balance or major portion is likewise enriched. Upon exhalation the entire mixture in the lungs is exhausted to atmosphere so that more than 90% of the oxygen fed into the mask is never utilized by the aviator's body, but is exhausted to atmosphere. This phenomenon has been recognized by those familiar with the art and attempts have been made to provide oxygen administering devices which would feed oxygen only to the first portion of the aviator's inhalation and would thereafter feed air which was not enriched in oxygen for the balance of the inhalation. Other attempts have been made to catch the exhaust from the oxygen mask so as to provide a rebreathing arrangement and thus recover the oxygen discharged from the mask. It appears that all of such prior art arrangements and attempts have, due to their complexity, weight and/or basic defect in design, been unsatisfactory.

It is an object of my invention to provide a simple compact light-weight oxygen regulator which will feed oxygen and/or outside air to the aviator without requiring any conscious effort on the part of the aviator. More particularly it is an object of my invention to provide an oxygen regulator which is so constructed and arranged that oxygen is fed into the aviator's mask in the absence of any pressure in the mask occasioned by exhalation. It is a further object of my invention to provide an oxygen regulator according to the preceding objects in which oxygen is fed under pressure into the aviator's mask until the aviator, by exhaling, builds up a slight pressure within the mask which is effective to interrupt the flow of oxygen into the mask. It is a further object of my invention to provide an oxygen system including a regulator and a mask so constructed and arranged that it is unnecessary for the aviator to overcome the effect of leakage around the mask in order to receive an adequate supply of oxygen. It is a further object of my invention to provide a regulator of such light weight and compact design that it may be attached directly to the mask and thus eliminate the inertia of an air column between the mask and the regulator. It is a further object of my invention to provide a regulator and a mask so constructed and arranged that the first portion of each inhalation breath will be enriched in oxygen to a greater degree than the major portion of the inhalation breath following said first portion, whereby great economies in the use of the oxygen supply is effected. It is a further object of my invention to provide a regulator according to the preceding objects in which the rate of flow of oxygen to the aviator is automatically varied in accordance with the variations in altitude. Further objects and advantages relating to simplicity in construction, light weight, efficient operation and economies in use and manufacture will appear from the following description and the appended drawings; wherein Figure 1 is an elevation of an oxygen system made according to my invention.

Figure 2 is an enlarged sectional view showing the arrangement of parts during inhaling at low altitudes.

Figure 3 is a sectional view showing the arrangement of the parts during exhaling at low altitudes.

Figure 4 is a sectional view showing the arrangement of the parts during inhaling at high altitudes.

Figure 5 is a sectional view showing the arrangement of parts during exhaling at high altitudes and Figure 6 is a sectional view of a modified form showing the position of parts during inhaling at high altitudes.

Generally speaking, the objects recited above and the advantages associated therewith are achieved according to my invention by providing a regulator having an inlet to receive oxygen under a pressure such as for instance 30 pounds per square inch and a breath responsive diaphragm valve in communication with an outlet arranged so that the valve is open and feeds oxygen to the regulator outlet in the absence of any exhalation pressure at the outlet. At the low altitudes, the breath responsive diaphragm valve supplies sufficient oxygen to the aviator. The breath responsive diaphragm valve functions as a pilot valve for a main oxygen port within the regulator so that the breath responsive diaphragm valve operates a second diaphragm valve within the regulator which second diaphragm valve opens a much larger path of oxygen passage through the regulator to supply an increased flow of oxygen at high altitudes. In the path of the larger oxygen flow I have arranged a valve which is aneroid controlled so that the operation of the second diaphragm valve referred to is ineffective to administer the larger flow of oxygen at the lower altitudes.

Referring to the drawings: Fig. 1 shows an oxygen system according to my invention wherein an oxygen container 6 is adapted to supply a quantity of oxygen at a relatively high pressure such as for instance 500 pounds per square inch, a conduit 7 is adapted to lead the oxygen to a reducing valve 8 where the 500 pound pressure is reduced to about 30 pounds per square inch and the oxygen is thereafter led through conduit 9 to the regulator 10 which may be secured directly to the mask 11 worn by the aviator.

The mask 11 is preferably provided with a check valve 12 for exhaling and exhausting air from the mask. It will be understood by those skilled in the art as the description proceeds that the small size and light weight of a regulator made in accordance with my invention permits the mounting thereof directly on the aviator's mask rather than on the wall of the cabin of the plane as in the prior art regulators. The regulator 10 comprises a body having inlet 13 and an outlet 14 secured to the mask. Intermediate the inlet and outlet of the regulator is a main port 15 designed to feed a relatively large volume of oxygen at high altitudes into the mask and a smaller port 16 constructed to feed sufficient quantities of oxygen into the mask at the lower altitudes.

Oxygen under pressure enters the inlet 13 and is led upwardly through the valve body into a diaphragm chamber 17—18. The chamber 17—18 is divided by a flexible diaphragm 19 which during inhaling acquires the position shown in Fig. 2 and during exhaling is positioned as shown in Fig. 3. The diaphragm 19 is apertured as at 20 so that the inlet pressure is admitted into the upper half 18 of the diaphragm chamber. Such inlet pressure may be exhausted from the chamber 18 through the small port 16 into the diaphragm chamber 21 and is led therefrom by way of passage 22 into the outlet 14 of the regulator. Below the main port 15 is mounted an aneroid 23 which is carried by a pair of leaf springs 24 which are in turn mounted on a shoulder 25 integral with a cap 26 threaded to the regulator body. The cap 26 is apertured as at 27 so as to admit outside air to travel into the aneroid chamber 28 and follow the path indicated by the arrow 29. A ring 30 is secured to the valve body by a threaded ring 31 at the upper side of the aneroid chamber 28 and the ring 30 is apertured as at 31a to provide a port for the outside air. This port is adapted to be closed during exhalation by a light disc 32 slidably mounted on the valve stem 33. The disc 32 is urged to its closed position by a light spring 34 which is disposed between the disc 32 and a bracket 35. The aneroid and the valve disc 32 are shown in Fig. 2 in the positions they occupy at the lower altitudes such as for instance fifteen to twenty thousand feet. It will be observed that at such altitudes the aneroid and the valve stem 33 are proportioned so that the valve head 36 closes the main port 15 and that the only path available for oxygen flowing to the mask is through the port 16 and passageway 22.

During inhalation and during the absence of any positive pressure which might be developed from exhalation the port 16 remains open. The diaphragm 40 and the needle valve 41 controlled by the diaphragm tend to remain in the position shown in Fig. 2 in the absence of any pressure in the diaphragm chamber 21. This means that without inhaling the port 16 is open and oxygen flows there-through into the mask and the port 16 remains open until a light pressure such as for instance .0006 pound per square inch is developed in the chamber 21. The light pressure referred to is sufficient to move the diaphragm 40 from the position shown in Fig. 2 to that shown in Fig. 3 which closes the port 16. The lever arm 43 and the area of the diaphragm 40 are proportioned with respect to the port opening 16 and the 30 pound pressure existing in chamber 18 so that the light pressure referred to is effective to move the needle 41 into the closed position shown in Fig. 3. It will be noted that during inhalation as shown in Fig. 2 the check valve 12 of the mask is maintained in its closed position wherein the disc 45 is held against the check valve port 46 by the light spring 47 and thus the inhalation maintains the port 16 open. In that short interval of time between the end of an exhalation and the beginning of an inhalation the absence of pressure in the chamber 21 brings about a flow of oxygen through the port 16 and into the mask so that the mask is filled with oxygen under pressure even in the absence of any inhalation. At the beginning of the inhalation the pressure drop in the regulator is sufficient to open the outside air port at 31a by raising the disc 32 and thus outside air is drawn into the mask immediately following the discharge into the mask of the oxygen by way of port 16. The last described operation results in the aviator drawing into his lungs on the first part of his inhalation breath oxygen and on the latter or major portion of the inhalation breath a large quantity of outside air by way of the port 31. This means that the first part of the breath includes the oxygen which is led into the minute interstices of the lungs and the second part of the breath comprises a mixture of air and oxygen which may be lean with respect to oxygen without adversely affecting the aviator. Since at low altitudes the aneroid remains out of contact with the valve stem 33 there is no flow of oxygen through the main port 15. Upon exhalation the pressure at the inlet side of the regulator is effective in the chamber 21 to close the port 16 and to close the check valve disc 32 all as shown in Fig. 3. The exhaling pressure in the mask is effective to move the disc 45 of the check valve 12 to open position as shown in Fig. 3, whereby the breath is exhausted to the atmosphere. Upon the closing of the port 16 the inlet pressure is permitted to build up in the chamber 18 above the diaphragm 19 so that the diaphragm 19 is moved from the position shown in Fig. 2 to that shown in Fig. 3. When, however, the port 16 is again opened, the inlet pressure is released from the chamber 18 and the inlet pressure is effective on the lower side of the diaphragm to raise the diaphragm 19 to its "open" position shown in Fig. 2. Since the port 15 is closed by the valve 36 at low altitudes the opening and closing operation of the diaphragm 19 is ineffective to vary the amount of oxygen directed into the mask.

When the aircraft reaches an extremely high altitude the aneroid is extended by the reduction in atmospheric pressure so that it acquires the position shown in Fig. 4, wherein the disc 23a at the top of the aneroid closes the port 31 against the admission of outside air and bears against the stem 33 of the valve 36 to hold said valve in its extreme open position. Upon inhalation as illustrated in Fig. 4 the diaphragm 40 remains in the position shown to relieve the inlet pressure in chamber 18 through the port 16. The effect of the relief in pressure in chamber 18 causes the diaphragm 19 to move to its open position whereby inlet pressure causes a fluid flow downwardly through the port 15 and through to the mask. Thus at high altitudes with the aneroid closing off outside air the aviator is administered pure oxygen in large quantities through the port 16.

Upon exhalation at high altitudes the pressure developed in the chamber 21 moves the diaphragm 40 to the position shown in Fig. 5 whereby the port 16 is closed, pressure builds up in chamber 18 thus closing off fluid flow to the main port 15. The check valve 12 is open as shown in Fig. 5 to exhaust the breath to atmosphere. It will be appreciated from the foregoing description of Figures 2 to 5 that between the low altitudes referred to and the high altitudes there will be a progressive change in the position of the aneroid so that there will be a gradual closing of the outside air inlet port 31 and a simultaneous gradual opening of the main port 15. The position of the aneroid and the construction of the main port valve at 15 is such that the amount of oxygen and outside air is automatically controlled in accordance with the altitude of the aircraft and the requirements of the aviator. The aneroid is supported by the cap 26 and thus by turning the cap upon its threaded connection with the body the aneroid may be adjusted by the aviator to increase or decrease the ratio of oxygen to outside air according to his comfort and physical requirements. In all phases of the regulator's operation at the various altitudes it is characteristic that immediately upon the cessation of an exhaling breath oxygen is fed into the mask and is available for the first portion of the breath. At extremely high altitudes the introduction of outside air is prohibited and only pure oxygen is fed into the mask for the entire inhalation. The spring leaf support 24 at the underside of the aneroid will permit further expansion of the aneroid after it has effected a closing position with respect to the port 31a as shown in Fig. 4. This spring mounting will guard against a rupture of the aneroid at extremely high altitudes.

In Fig. 6 I have shown a modified form of my invention wherein an aneroid 50 is mounted substantially as in the preferred embodiment. The aneroid 50, however, lacks any disc or closure which would be effective to close the port 31a. Thus even at high altitudes where the aneroid has acquired a position opening the main port 15 outside air is permitted to enter the regulator. This form of the invention is designed to effect greater economies of oxygen in that at high altitudes outside air is drawn into the regulator by inhalation immediately following a quantity of oxygen. A result similar to that obtained with the form shown in Fig. 6 may be obtained in the preferred embodiment by the use of a longer valve stem 33 and adjusting the aneroid 23 so that a full open position of the valve 36 is obtained and the disc 23a of the aneroid remains open with respect to the port 31a at high altitudes.

Although I have shown and described in considerable detail the preferred embodiment and one modification of my invention, it will be appreciated that those skilled in the art may effect numerous variations therein without departing from the scope of the invention as defined in the following claims.

I claim:

1. A regulator comprising a body having an inlet and an outlet, a main port and a pilot port between the inlet and the outlet, diaphragm means and aneroid means arranged in the path of fluid flow through said main port so as to selectively interrupt or permit flow through said port, outlet pressure responsive means to control said pilot port, said pilot port controlling said diaphragm means whereby a predetermined pressure drop at said outlet establishes a fluid flow through said pilot port effecting an opening movement of said diaphragm means with respect to said main port, and the pilot port when open by-passing the main port whereby a fluid flow is effected between the inlet and outlet regardless of the controlled condition of the main port.

2. A regulator comprising a body having an inlet and an outlet, a main port between said inlet and outlet, two separate means arranged to interrupt the fluid flow through said main port, the first of said means in the path of flow through said main port being a flexible diaphragm controlled by pressure differences at said outlet and the second of said means comprising an aneroid responsive to changes in atmospheric pressure, the regulator having a passage therein by-passing the main port, and a pilot valve controlling fluid flow through said passage responsive to outlet pressure whereby fluid flow may be effected between the inlet and outlet when the main port is closed.

3. A regulator comprising a body having an inlet and an outlet, a main port between said inlet and outlet, a diaphragm chamber including a diaphragm arranged in the path of the fluid flow between the inlet and main port, a pilot port in said diaphragm chamber on one side of the diaphragm, a passageway leading from said pilot port to the outlet, an outlet pressure responsive diaphragm controlling said pilot port whereby upon a predetermined pressure drop at said outlet the pilot port is opened to effect a pressure drop in said diaphragm chamber operative to move the diaphragm therein to a position away from said main port and an aneroid controlled valve in the path of flow through said main port to control the fluid flow through the main port subsequent to the movement of the diaphragm away from the main port.

4. A regulator comprising a body having an inlet and an outlet, a diaphragm chamber having a flexible diaphragm mounted therein, a main port formed in said diaphragm chamber on one side of the diaphragm and a pilot port on the other side of said diaphragm, an aperture in said diaphragm whereby inlet fluid pressure is conducted through the diaphragm to said pilot port, pressure responsive means in communication with said outlet to control said pilot port whereby a predetermined pressure drop at said outlet effects an opening of the pilot port and a movement of the diaphragm away from the main port, an aneroid controlled valve arranged in the path of fluid flow between said main port and the outlet to control the fluid flow volume between the main port and the outlet in response to atmospheric pressure changes, and the pilot port when open being adapted to by-pass fluid around the main port whereby fluid flow may be effected between the inlet and outlet when the main port is closed.

5. An oxygen regulator comprising a body having an inlet and an outlet, a main port and a pilot port between said inlet and outlet to establish a fluid flow of oxygen to outlet, means to admit outside air into said outlet including a check valve arranged to open and effect passage of outside air into the regulator upon a reduction of the pressure at the outlet to a point where said outlet pressure is below atmospheric pressure, pressure responsive means controlling said pilot port constructed and arranged to open said port upon a drop of outlet pressure to a point which is above the outlet pressure effective to open said check valve whereby during a pressure drop at the outlet the pilot port is opened prior to the opening of said check valve so that oxygen is fed to the outlet prior to the admission of outside air, a main valve controlling the main port, supplemental means controlling flow through the main port when the main valve is in open position, and said supplemental means being operable independently of the main valve to open the main port responsive to a pressure drop sufficient to effect opening of the pilot port.

GEORGE C. FIELDS.